United States Patent [19]
Matsushita

[11] Patent Number: 5,313,920
[45] Date of Patent: May 24, 1994

[54] CONTROL DEVICE FOR INTERNAL COMBUSTION ENGINE

[75] Inventor: Souichi Matsushita, Susono, Japan

[73] Assignee: Toyota Jidosha Kabushiki Kaisha, Aichi, Japan

[21] Appl. No.: 966,226

[22] Filed: Oct. 26, 1992

[30] Foreign Application Priority Data

Oct. 28, 1991 [JP] Japan .................. 3-281527

[51] Int. Cl.$^5$ .................. F02D 41/38; F02B 17/00
[52] U.S. Cl. .................. 123/295; 123/300; 123/431; 123/435
[58] Field of Search .......... 123/295, 299, 300, 305, 123/431, 435, 436

[56] References Cited

U.S. PATENT DOCUMENTS

| | | | |
|---|---|---|---|
| 4,667,634 | 5/1987 | Matsumura et al. | 123/357 |
| 4,704,999 | 11/1987 | Hashikawa et al. | 123/299 |
| 4,955,339 | 9/1990 | Sasaki et al. | 123/295 |
| 5,127,328 | 7/1992 | Ito | 123/305 X |
| 5,170,759 | 12/1992 | Ito | 123/305 X |
| 5,215,053 | 6/1993 | Ito | 123/276 |

FOREIGN PATENT DOCUMENTS

63-154816 6/1988 Japan .
1-187312 7/1989 Japan .
2-191819 7/1990 Japan .

Primary Examiner—Tony M. Argenbright
Attorney, Agent, or Firm—Kenyon & Kenyon

[57] ABSTRACT

A control device for an internal combustion engine having a cylinder and a spark plug, the control device including a fuel feeding unit for feeding fuel into the cylinder, feeding a part of an amount of fuel to be injected during an intake stroke to form an air-fuel premixture, and feeding the remaining part of the amount of fuel to be injected during a compression stroke to form an air-fuel mixture around the spark plug for ignition; a pressure detecting unit for detecting pressure in the cylinder; a combustion state determining unit for determining a combustion state in the cylinder on the basis of the pressure detected by the pressure detecting unit; and a fuel feeding control unit for controlling a ratio of the part of the amount of fuel to be injected to the amount of fuel to be injected on the basis of the result of determination of the combustion state determining unit so that a good state of combustion is obtained.

17 Claims, 12 Drawing Sheets

|  | Ne₁ | Ne₂ | ----- | Neₙ |
|---|---|---|---|---|
| $(QA/Ne)_1$ | Q₁₁ | Q₁₂ | ----- | Q₁ₙ |
| $(QA/Ne)_2$ | Q₂₁ | Q₂₂ | ----- | Q₂ₙ |
| ⋮ | ⋮ | ⋮ |  | ⋮ |
| $(QA/Ne)_n$ | Qₙ₁ | Qₙ₂ | ----- | Qₙₙ |

Fig. 14

|  | $Q_1$ $Q_2$ ----- $Q_n$ |
|---|---|
| $(P_1r)_1$ | $(P_3)_{11}$ $(P_3)_{12}$ ---- $(P_3)_{1n}$ |
| $(P_1r)_2$ | $(P_3)_{21}$ $(P_3)_{22}$ ---- $(P_3)_{2n}$ |
| ⋮ | ⋮ |
| $(P_1r)_m$ | $(P_3)_{m1}$ $(P_3)_{m2}$ ---- $(P_3)_{mn}$ |

CONTROL DEVICE FOR INTERNAL COMBUSTION ENGINE

BACKGROUND OF THE INVENTION

1. Field of the Invention

The present invention relates to a control device for an internal combustion engine.

2. Description of the Related Art

Japanese Unexamined Patent Publication (Kokai) No. 2-169834 discloses an internal combustion engine wherein, during low load operation, the entire required amount of fuel injection is injected into the engine cylinders during the compression stroke to form an air-fuel mixture around the spark plugs, while during medium and high load operation, fuel is injected into the engine cylinders during the intake stroke to form an air-fuel premixture and fuel is injected into the engine cylinders during the compression stroke to form an air-fuel mixture for ignition near the spark plugs.

In this internal combustion engine, however, among the load regions in which the amount of fuel injection is divided between the intake stroke and the compression stroke, in the region of low load operation, the suitable ratio of the amount of fuel injection in the intake stroke and the amount of fuel injection in the compression stroke is limited to within a narrow range based on the engine operating state, so in this operating region, it is difficult to always obtain good combustion with a small amount of torque fluctuation.

SUMMARY OF THE INVENTION

An object of the present invention is to provide a control device for an internal combustion engine by which the above problem can be solved.

According to the present invention, there is provided a control device for an internal combustion engine having cylinder and spark plug, the control device including a fuel feeding means for feeding fuel into the cylinder, feeding a part of an amount of fuel to be injected during an intake stroke to form an air-fuel premixture, and feeding the remaining part of the amount of fuel to be injected during a compression stroke to form an air-fuel mixture around the spark plug for ignition; a pressure detecting means for detecting pressure in the cylinder; a combustion state determining means for determining a combustion state in the cylinder on the basis of the pressure detected by the pressure detecting means; and a fuel feeding control means for controlling a ratio of the part of the amount of fuel to be injected to the amount of fuel to be injected on the basis of the result of determination of the combustion state determining means so that a good state of combustion is obtained.

The present invention may be more fully understood from the description of preferred embodiments of the invention set forth below, together with the accompanying drawings.

BRIEF DESCRIPTION OF THE DRAWINGS

In the drawings:

FIG. 14 is a map of the reference cylinder pressure $P_3$ based on the amount of fuel injection Q and $P_{1r}$.

DESCRIPTION OF THE PREFERRED EMBODIMENTS

Figure 1:
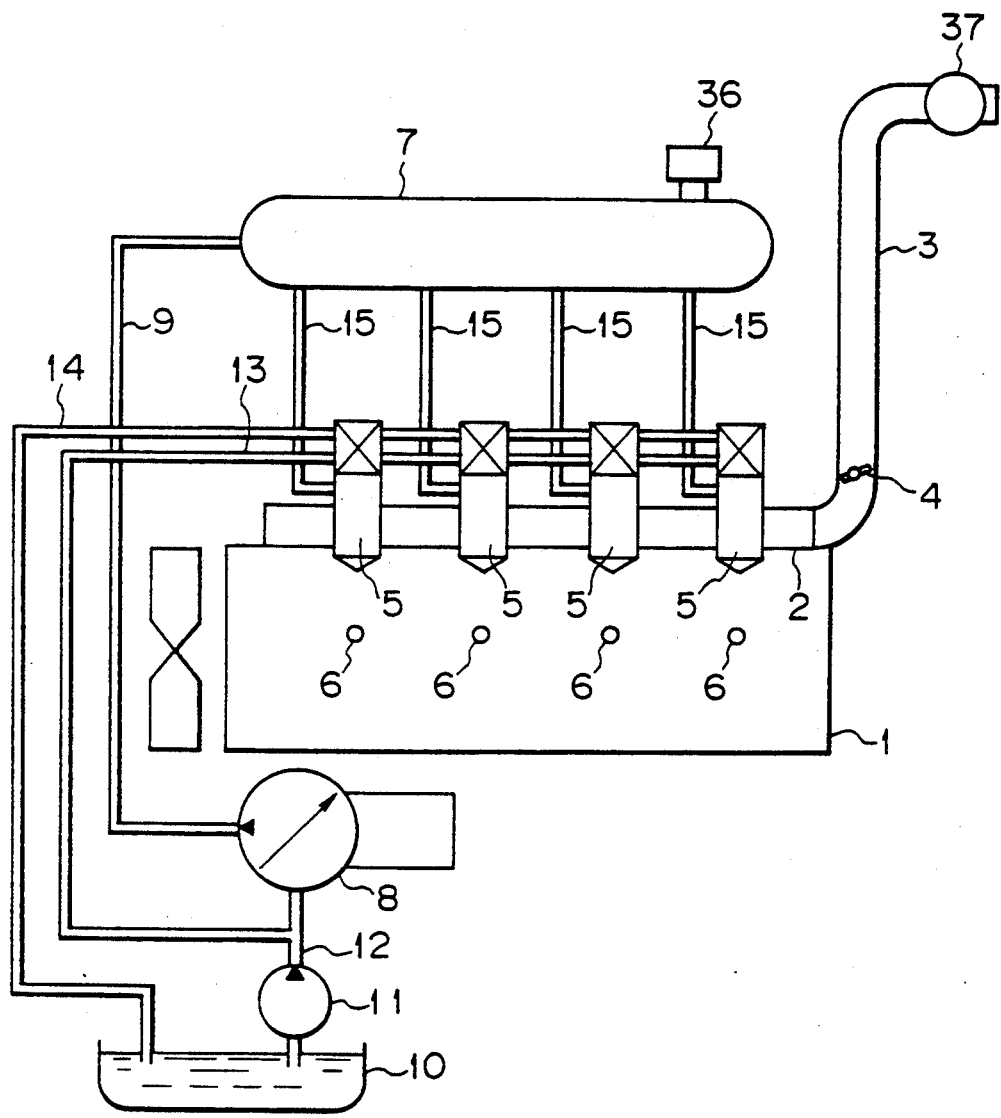
FIG. 1 is an overall view of an internal combustion engine of an embodiment of the present invention.

FIG. 1 is an overall view of an internal combustion engine of an embodiment of the present invention. In FIG. 1, 1 is the engine body, 2 is a surge tank, 3 is an intake pipe extending from the surge tank 2 and 4 is a throttle valve provided in the middle of the intake pipe 3. The internal combustion engine also includes fuel injectors 5 for directly injecting fuel into the cylinders, 6 are spark plugs, 7 is a high pressure reserve tank, 8 is a high pressure fuel pump with a controllable discharge pressure for sending high pressure fuel under pressure through a high pressure conduit 9 to the reserve tank 7, 10 is a fuel tank, and 11 is a low pressure fuel pump for feeding fuel through a conduit 12 from the fuel tank 10 to the high pressure fuel pump 8. The discharge side of the low pressure fuel pump 11 is connected to a piezoelectric element cooling introduction pipe 13 for cooling the piezoelectric elements of the fuel injectors 5. A piezoelectric element cooling return pipe 14 is linked with the fuel tank 10. Fuel flowing through the piezoelectric element cooling introduction pipe 13 is returned to the fuel tank through this return pipe 14. Branch pipes 15 connect the high pressure fuel injectors 5 to the high pressure reserve tank 7.

A fuel pressure sensor 36 is attached to the high pressure reserve tank 7, which fuel pressure sensor 36 detects the fuel pressure inside the high pressure reserve tank 7. Based on the pressure detected by the fuel pressure sensor 36, the high pressure fuel pump 8 is controlled so that the fuel pressure inside the high pressure reserve tank 7 becomes the target fuel pressure. At the inlet of the intake pipe 3 is disposed an air flow meter 37 for detecting the amount of intake air QA.

Figure 2:
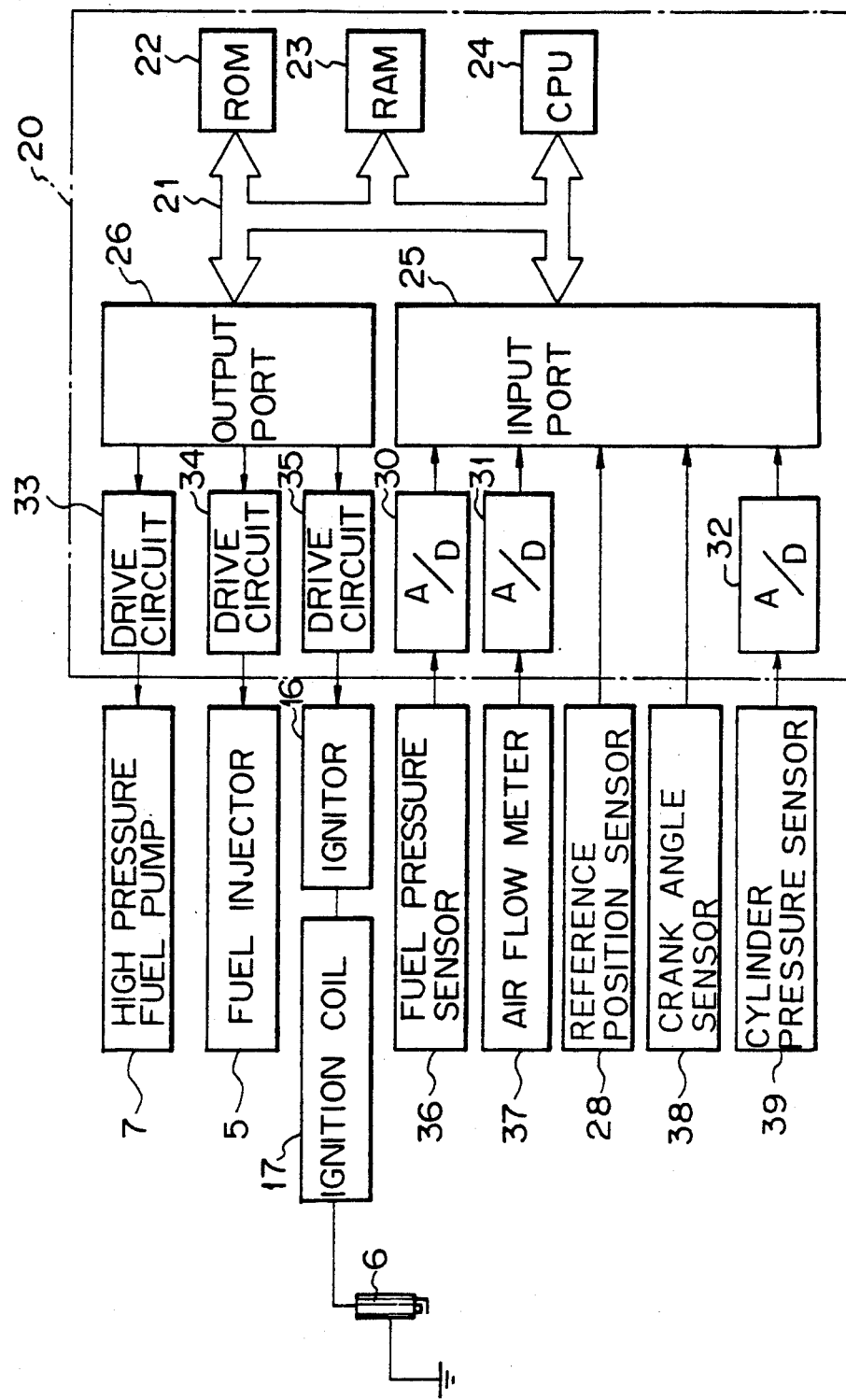
FIG. 2 is a block diagram of an electronic control unit.

FIG. 2 is a block diagram of the constitution of an electronic control unit 20. Referring to FIG. 2, the electronic control unit 20 is comprised of a digital computer. It is provided with a read only memory (ROM) 22, a random access memory (RAM) 23, a microprocessor (CPU) 24, an input port 25, and an output port 26 connected by a bidirectional bus 21.

The fuel pressure sensor 36 and the air flow meter 37 are connected to the input port 25 through the corresponding AD converters 30 and 31. A reference position sensor 28 which generates a reference position detection pulse signal with each 720 degrees crank angle and a crank angle sensor 38 which generates a crank angle detection signal with each 30 degrees crank angle are connected to the input port 25. Further, a cylinder pressure sensor 39 for detecting the absolute pressure inside the engine cylinders (see FIG. 4) is connected via the AD converter 32 to the input port 25.

On the other hand, the output port 26 is connected through the corresponding drive circuits 33 and 34 to the high pressure reserve tank 7 and the fuel injectors 5. Further, the output port 26 is connected through the drive circuit 35 to an ignitor 16. The ignitor 16 is connected through an ignition coil 17 to the spark plugs 6.

Figure 3:
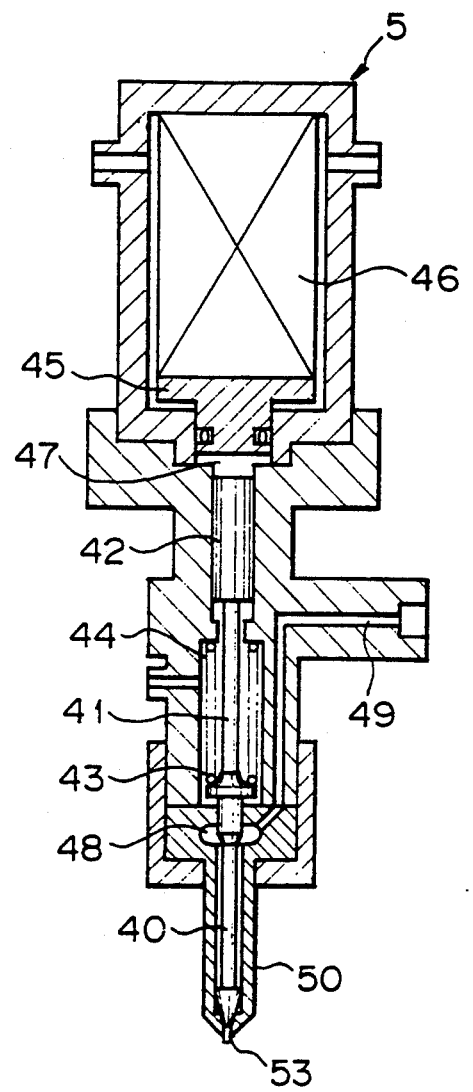
FIG. 3 is a longitudinal sectional view of a fuel injector.

FIG. 3 shows a side sectional view of a fuel injector 5. Referring to FIG. 3, 40 is a needle inserted into a nozzle 50, 41 is a pressurizing rod, 42 is a movable plunger, 43 is a compression spring disposed inside a spring holding chamber 44 and pressing the needle 40 downward, 45 is a pressurizing piston, 46 is a piezoelectric element, 47 is a pressurizing chamber formed between the top surface of the movable plunger 42 and the piston 45 and filled with fuel, and 48 is a needle pressurizing chamber. The needle pressurizing chamber 48 is connected to the high pressure reserve tank 7 (FIG. 1) through a fuel passageway 49 and branch pipes 14 and therefore the high pressure fuel inside the high pressure reserve tank 7 is fed through the branch pipes 14 and the fuel passageway 49 to the inside of the needle pressurizing chamber 48. When the piezoelectric element 46 is charged, the piezoelectric element 46 elongates and thereby the fuel pressure inside the pressurizing chamber 47 is raised. As a result, the movable plunger 42 is pressed downward, and the nozzle opening 53 is held in a closed state by the needle 40. On the other hand, when the piezoelectric element 46 is discharged, the piezoelectric element 46 contracts and the fuel pressure in the pressurizing chamber 47 falls. As a result, the movable plunger 42 rises, so the needle 40 rises and the fuel is injected from the nozzle opening 53.

Figure 4:
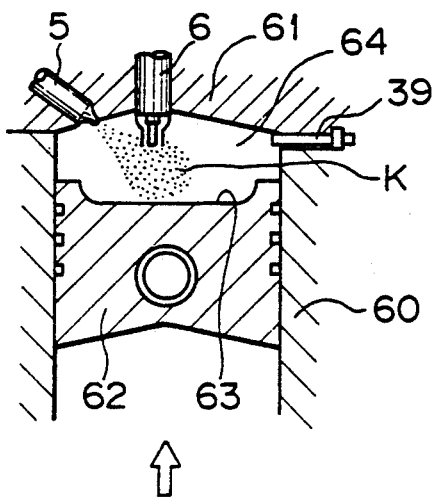
FIG. 4 is a longitudinal sectional view of the engine of FIG. 2.

FIG. 4 is a longitudinal sectional view of the engine of FIG. 2. Referring to FIG. 4, 60 is a cylinder block, 61 is a cylinder head, 62 is a piston, 63 is a substantially cylindrical depression formed in the top surface of the piston 62, and 64 is a cylinder chamber formed between the top surface of the piston 62 and the walls in the cylinder head 61. The spark plug 6 is attached substantially at the center of the cylinder head 61 close to the cylinder chamber 64. While not shown in the figure, an intake port and exhaust port are formed in the cylinder head 61. At the opening of the intake port and exhaust port into the cylinder chamber 64 are disposed an intake valve 66 (see FIG. 7(a)) and an exhaust valve. The fuel injector 5 is a swirl type fuel injector, which injects mist-like fuel with a large dispersion angle and a weak penetrating force. The fuel injector 5 faces downward at a slant and is disposed at the top portion of the cylinder chamber 64. It is disposed so as to inject fuel toward the vicinity of the spark plug 6. The direction of fuel injection and the fuel injection timing of the fuel injector 5 are determined so that the injected fuel goes toward the depression 63 formed in the top portion of the piston chamber 62.

Figure 5:
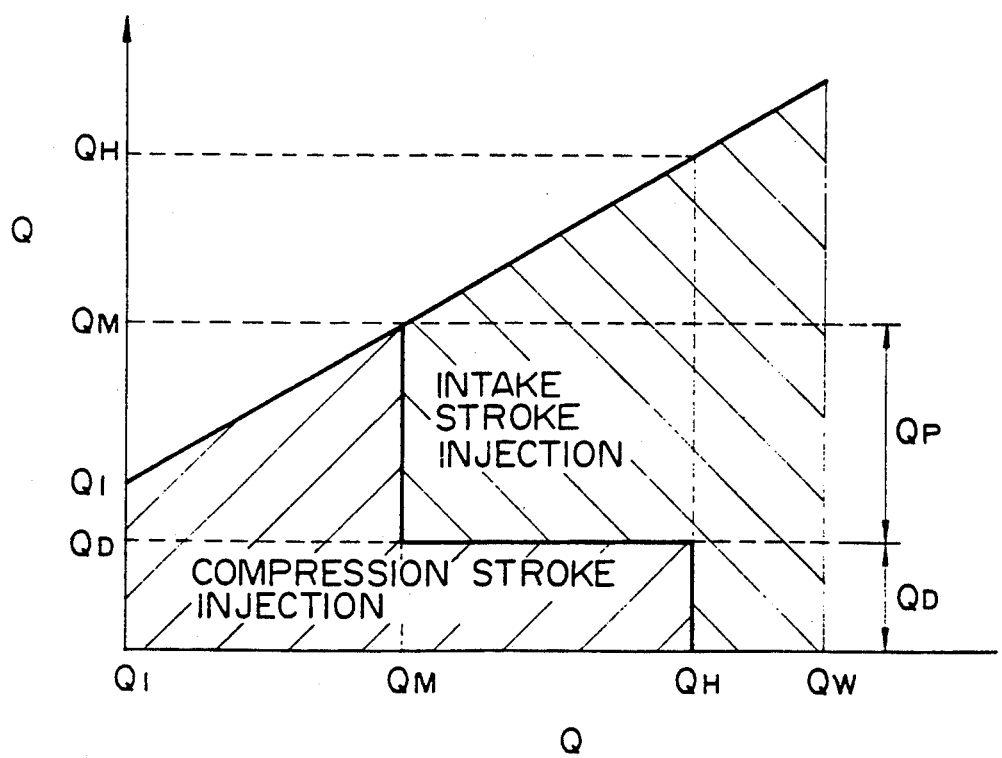
FIG. 5 is a graph of an example of a control pattern of injection in the compression stroke and injection in the intake stroke.

The internal combustion engine of this embodiment is a internal combustion engine able to divide the injection of the amount of fuel between the intake stroke and the compression stroke in accordance with the engine operating state. FIG. 5 shows the ratio of the amount of fuel injection in the intake amount to the amount of fuel injection in the compression stroke at a predetermined engine rotational speed. Referring to FIG. 5, the horizontal axis shows the load of the engine. In FIG. 5, the amount Q of fuel injection is taken as the load. The vertical axis also shows the amount Q of fuel injection.

When the amount of fuel injection showing the engine load is from the amount of fuel injection during idling $Q_I$ to the amount of fuel injection during medium load $Q_M$, fuel is injected only in the compression stroke. The amount of fuel injection in the compression stroke $Q_C$ is gradually increased from the amount of fuel injection during idling $Q_I$ to the amount of fuel injection during medium load $Q_M$. When the amount of fuel injection showing the engine load exceeds $Q_M$, the amount of fuel injection during the compression stroke is rapidly reduced from $Q_M$ to $Q_D$ and the amount of fuel injection in the intake stroke is rapidly increased to $Q_P$. $Q_M$ is the amount of fuel injection near the medium load and is shown by the following equation as the sum of $Q_D$ and $Q_P$:

$$Q_M = Q_D + Q_P$$

Here $Q_D$ is the minimum amount of fuel injection in the compression stroke which is able to form an air-fuel mixture ignitable by the spark plug 6 and is an amount smaller than the amount of fuel injection during idling $Q_I$. Further, $Q_P$ is the minimum amount of fuel injection during the intake stroke enabling propagation of the flame ignited by the spark plug 6 when the fuel injected in the intake stroke is uniformly dispersed in the cylinder chamber 64. From the amount of fuel injection during medium loads $Q_M$ to the amount of fuel injection at high loads $Q_H$, the amount of fuel injection is divided between the compression stroke and the intake stroke. The amount of fuel injection during the compression stroke does not depend on the engine load. It is made constant at $Q_D$. The amount of fuel injection during the intake stroke is increased along with the increase of the engine load.

At times of very high loads when the engine load exceeds the amount of fuel injection at high loads $Q_H$ and reaches the maximum amount of fuel injection $Q_M$, since the amount of fuel injection is large, the concentration of the air-fuel premixture in the cylinder chamber formed by the injection in the intake stroke is great enough for ignition, so the injection in the compression stroke for ignition purposes is foregone and the entire required amount of fuel injection is injected in the intake stroke. The amount of fuel injection during high loads $Q_H$ is the minimum amount of fuel injection in the intake stroke able to form a uniform air-fuel mixture which can be ignited by the spark plug even in the case where the fuel is uniformly dispersed in the cylinder chamber.

Figure 6:
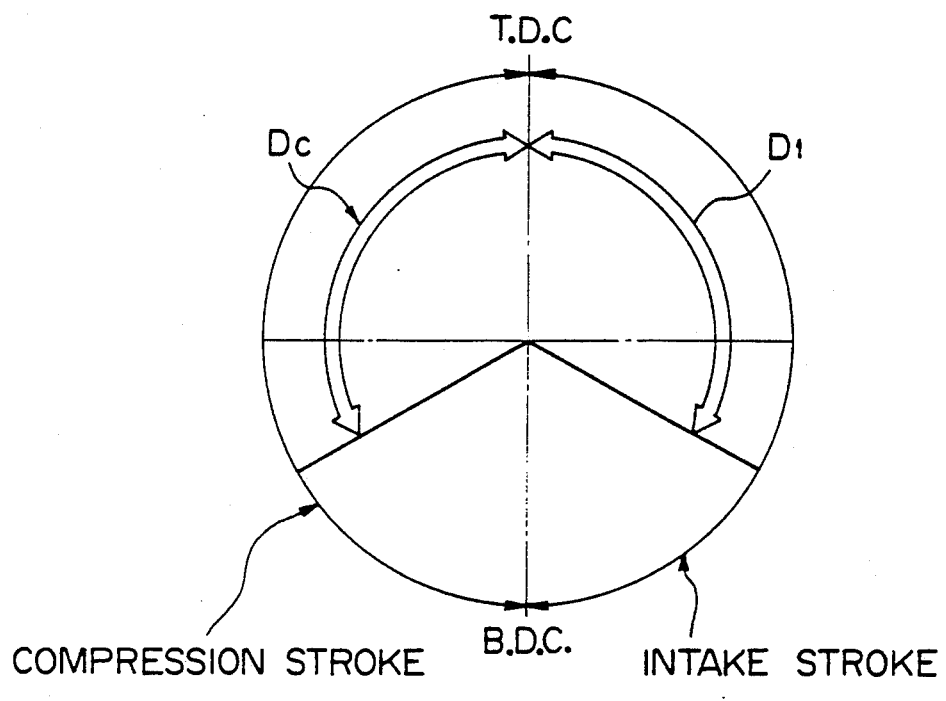
FIG. 6 is a graph of the timing of fuel injection.

As shown in FIG. 6, the intake stroke means the period from the top dead center of the exhaust process to the bottom dead center of the intake process, while the compression stroke means the period from the bottom dead center of the compression process to the top dead center of the compression process.

The injection during the intake stroke is executed during the period shown by $D_I$. This period $D_I$ corresponds to substantially the former half of the intake stroke. The injection during the compression stroke is executed in the period shown by $D_C$. This period $D_C$ corresponds to substantially the latter half of the compression stroke. The fuel is injected in the period $D_I$ or $D_C$, so the injected fuel does not directly strike the cylinder block 60, so almost none of the injected fuel adheres to the inside surface of the cylinder block 60.

In the region from near the medium load (amount of fuel injection $Q_M$) to the low load, as shown in FIG. 4, only the injection during the compression stroke is executed in the latter period of the compression stroke and fuel is injected from the fuel injector 5 toward the spark plug 6 and the depression 63 at the top surface of the piston 62. This injected fuel has a weak penetrating force. Further, the pressure in the cylinder chamber 64 is high and the flow of air is weak. Therefore, the injected fuel tends to concentrate at the region K near the spark plug 6. Since the distribution of fuel in the region K is uneven and changes from a rich air-fuel mixture layer to an air layer, there is a combustible air-fuel mixture layer near the stoichiometric air-fuel ratio which can be most easily burnt. Therefore, the combustible air-fuel mixture layer near the spark plug 6 is easily ignited and the ignited flame propagates throughout the uneven air-fuel mixture layer as a whole to complete the combustion. In this way, in the region from the medium load to the low load, the fuel is injected near the spark plug 6 in the latter period of the compression stroke, whereby a combustible air-fuel mixture layer is formed near the spark plug 6 and therefore excellent ignition and combustion can be obtained.

Figure 7:
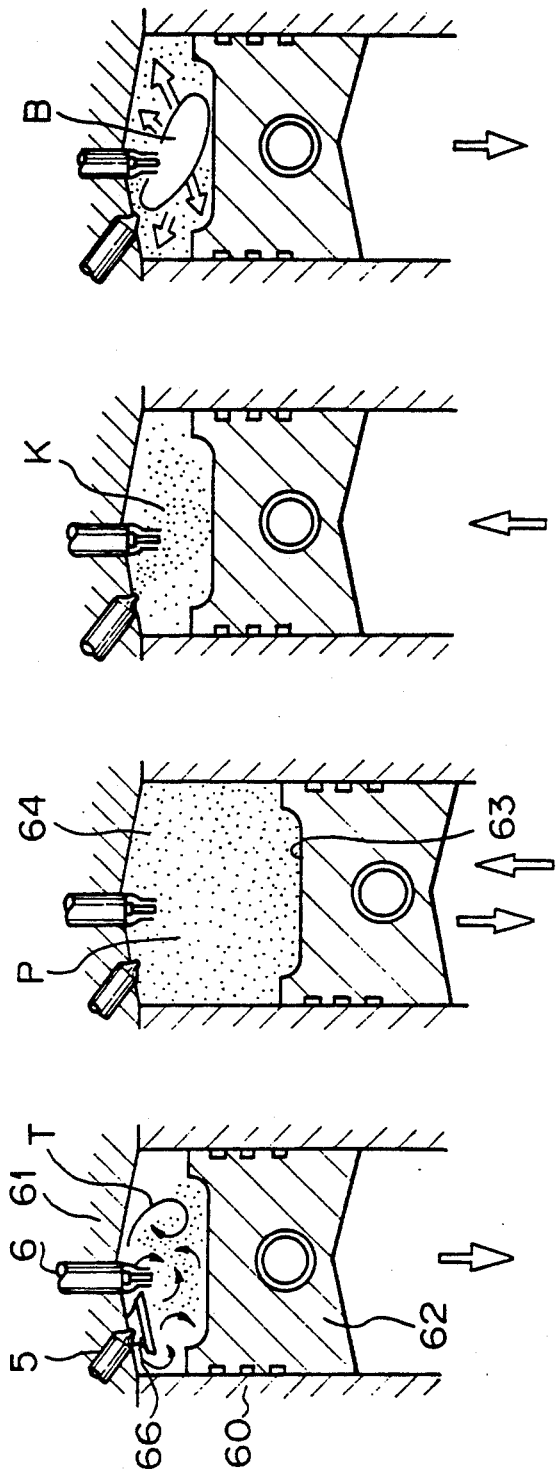
FIGS. 7(a-d) are an explanatory view of the operation when injecting fuel in the intake stroke and the compression stroke.

On the other hand, in the region from near the medium load (amount of fuel injection $Q_M$) to the high load, as shown in FIG. 7, the injection during the intake stroke is executed in the early period of the intake stroke (FIG. 7(a)) and fuel is injected from the fuel injector 5 toward the spark plug 6 and the depression 63 of the top surface of the piston 62. This injected fuel is mist-like fuel of a large dispersion angle and a weak penetrating force. Part of the injected fuel floats free in the cylinder chamber 64 and the rest strikes the depression 63. The injected fuel is dispersed in the cylinder chamber 64 by the disturbance T in the cylinder chamber 64 caused by the flow of intake air entering from the intake port to the cylinder chamber 64 and therefore an air-fuel premixture P is formed in the period from the intake stroke to the compression stroke (FIG. 7(b)). The air-fuel ratio of this air-fuel premixture P is an air-fuel ratio of an extent where the ignited flame can be propagated. Further, in the state of FIG. 7(b), since the extension of the center axial line of the injected fuel is oriented toward the cylinder chamber, if the penetrating force of the injected fuel is strong, part of the mist is liable to deposit directly on the cylinder walls. In this embodiment, there is no particular problem since the injection is performed with a relatively weak penetrating force, but in the embodiment of the present invention, the effect of prevention of deposition of fuel on the cylinder walls is enhanced by making this period a no-ninjection period. Next, at the latter period of the compression stroke (FIG. 7(c)), the injection at the compression stroke is executed and fuel is injected from the fuel injector 5 toward the vicinity of the spark plug 6 and the depression 63 in the top surface of the piston 6. Since the injected fuel is directed toward the spark plug 6 and further has a weak penetrating force and since the pressure inside the cylinder chamber 64 is large, the injected fuel tends to concentrate at the region K near the spark plug 6. The fuel in the region K is uneven in distribution and changes from a rich air-fuel mixture layer to an air layer, so there is a combustible air-fuel mixture layer near the stoichiometric air-fuel ratio, which is most easily burnt, in the region K. Therefore, when the combustible air-fuel mixture layer is ignited by the spark plug 6, combustion proceeds centered in the uneven air-fuel mixture region K (FIG. 7(d)). In this combustion process, the flame propagates successively to the air-fuel premixture P from near the expanded combustion gas B and the combustion is completed. In this way, by injecting fuel in the early period of the intake stroke in the medium load and high load region, an air-fuel mixture for flame propagation is formed the cylinder chamber 64 as a whole and by injecting fuel in the latter period of the compression stroke, a relatively thin air-fuel mixture is formed near the spark plug 6 and therefore an air-fuel mixture for ignition is formed.

In particular, if the entire required amount of injection is injected in the intake stroke or in the first half of the compression stroke in medium load operation as in a conventional engine, the injected fuel ends up dispersed in the cylinder chamber 64 as a whole, so the air-fuel mixture formed in the cylinder chamber 64 becomes too thin and there is the problem of difficult ignition and combustion. On the other hand, if the entire required amount of injection is injected in the latter period of the compression stroke in medium load operation, there are the problems that a large amount of smoke is produced and it is not possible to raise the rate of utilization of air, so a sufficiently high output cannot be obtained.

Therefore, as mentioned earlier, during medium load operation, injection is performed divided between the intake stroke and the compression stroke, so an excellent ignition and a high output due to combustion with a high rate of utilization of air are obtained.

Further, near the medium load, the uniform air-fuel mixture formed by the fuel injected in the intake stroke may have an air fuel ratio excellent for enabling flame propagation, which is thinner than an ignitable air-fuel ratio, so the fuel economy is improved by lean combustion.

In FIG. 5, however, in the period between the amounts of fuel injection $Q_M$ and $Q_H$, that is, the load region where the required amount of fuel injection is divided between the intake stroke and the compression stroke, in the load region on the low load side, that is, in the load region near $Q_M$, the suitable ratio of the amount of fuel injection during the intake stroke and the amount of fuel injection during the compression stroke is limited to a narrow range in accordance with the engine operating state, so there is the problem that it is difficult to always obtain an excellent combustion with a small amount of torque fluctuation in this load region.

Therefore, in this embodiment, the cylinder pressure in the engine cylinders is detected, the state of combustion is judged based on the cylinder pressure, and the ratio of the amount of fuel injection in the intake stroke and the amount of fuel injection in the compression stroke is changed based on this judgement so as to obtain excellent combustion.

Figure 8:
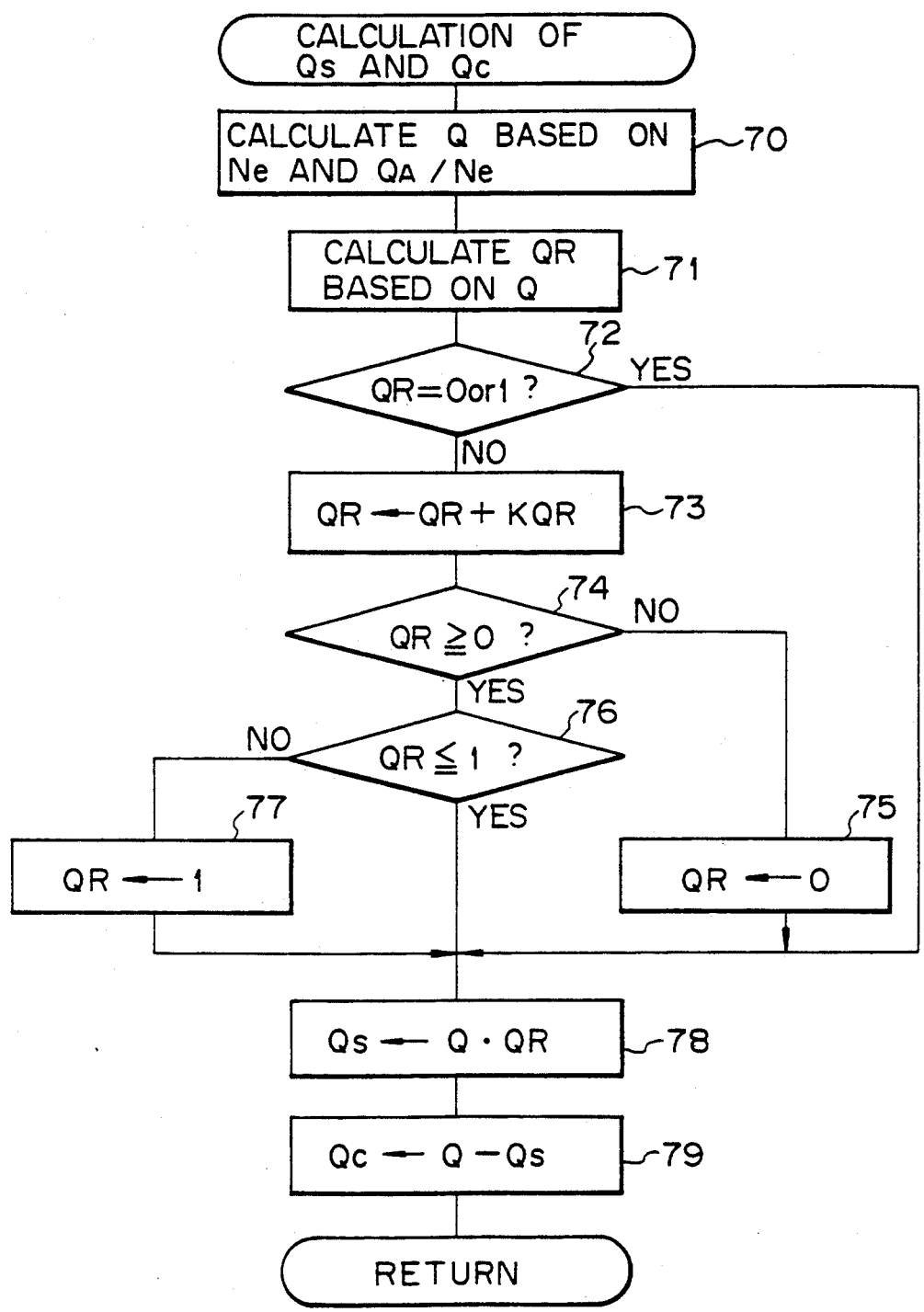
FIG. 8 is a flow chart for calculating the amount of fuel injected in the intake stroke and the compression stroke.

FIG. 8 shows the routine for calculating the amount of fuel injection in the intake stroke and the compression stroke. This routine is executed by interruption every predetermined crank angle.

Referring to FIG. 8, first, at step 70, the required amount of fuel injection Q is found from a map (see FIG. 9) based on the engine rotational speed Ne and QA/Ne. Here, QA/Ne is the amount of intake air per rotation of the engine and expresses the engine load. Next, at step 71, the division rate QR is calculated based on the required amount of fuel injection Q. Here, the division rate QR is the ratio of the amount of fuel injection in the intake stroke Qs to the required amount of fuel injection Q.

Figures 9, 10:
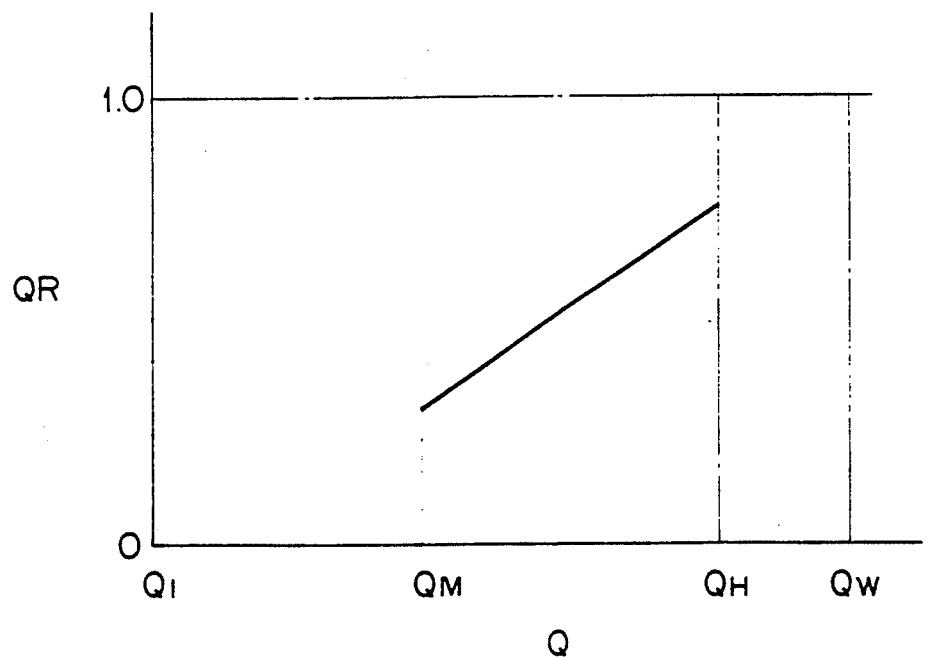
FIG. 9 is a map of the amount of fuel injection Q based on the engine rotational speed Ne and QA/Ne.
FIG. 10 is a map of the rate of division QR based on the amount Q of fuel injection.

The map of the required amount of fuel injection Q and the division rate QR is shown in FIG. 10. FIG. 10 corresponds to FIG. 5. QR is 0 when the required amount of fuel injection Q is from $Q_I$ to $Q_M$. Therefore, the entire required amount of fuel injection Q is injected during the compression stroke. From $Q_M$ to $Q_H$, injection is performed during the intake stroke and the compression stroke, with the ratio of the amount of fuel injection during the intake stroke increasing in accordance with an increase in the load. From $Q_H$ to $Q_W$, QR becomes 1.0 and the entire required amount of fuel injection Q is injected in the intake stroke.

Referring again to FIG. 8, at step 72, it is determined if QR is equal to 0 or 1. When the division rate QR is not equal to 0 or 1, the routine proceeds to step 73, where the correction value KQR is added to QR. The correction value KQR is calculated by the routine shown in FIG. 11A and FIG. 11B, explained later.

At step 74, it is determined if QR is more than 0. If QR<0, the routine proceeds to step 75, where QR is made 0. On the other hand, if QR≧0, the routine proceeds to step 76, wherein it is determined if QR≦1. If QR>1, the routine proceeds to step 77, where QR is made 1. If QR≦1, the value of QR is held as it is.

At step 78, the amount of fuel injection in the intake stroke $Q_S$ is calculated by the following equation:

$$Q_S = Q \cdot QR$$

Next, at step 79, the amount of fuel injection of the intake stroke is subtracted from Q so as to calculate the amount of fuel injection during the compression stroke $Q_C$.

If it is determined at step 72 that QR is 0 or 1, step 73 to step 77 are skipped and QR is not corrected, but is maintained as 0 or 1.

Figure 11A:
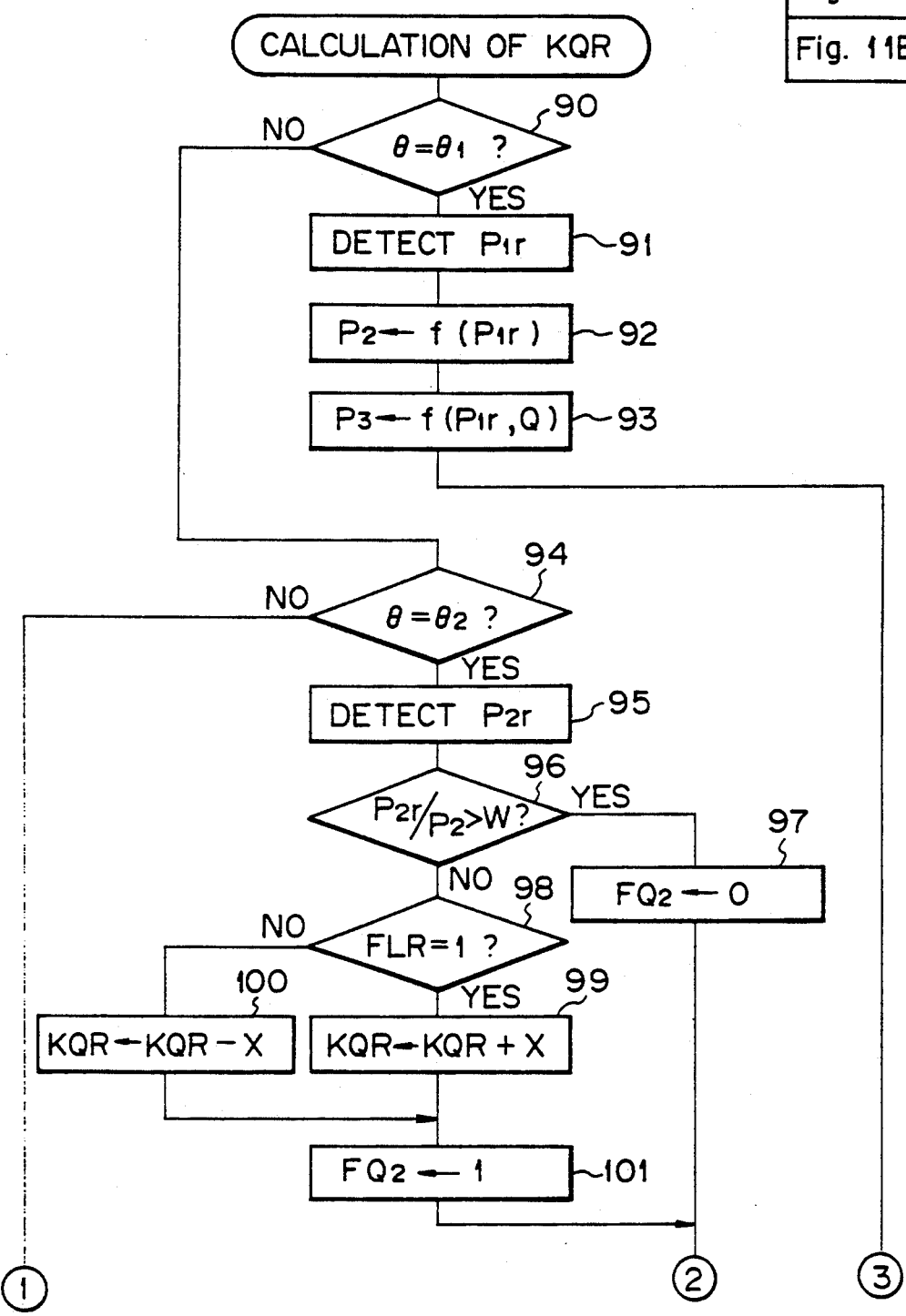
FIGS. 11A and 11B are flow charts for calculating a correction value KQR.
Figure 11B:
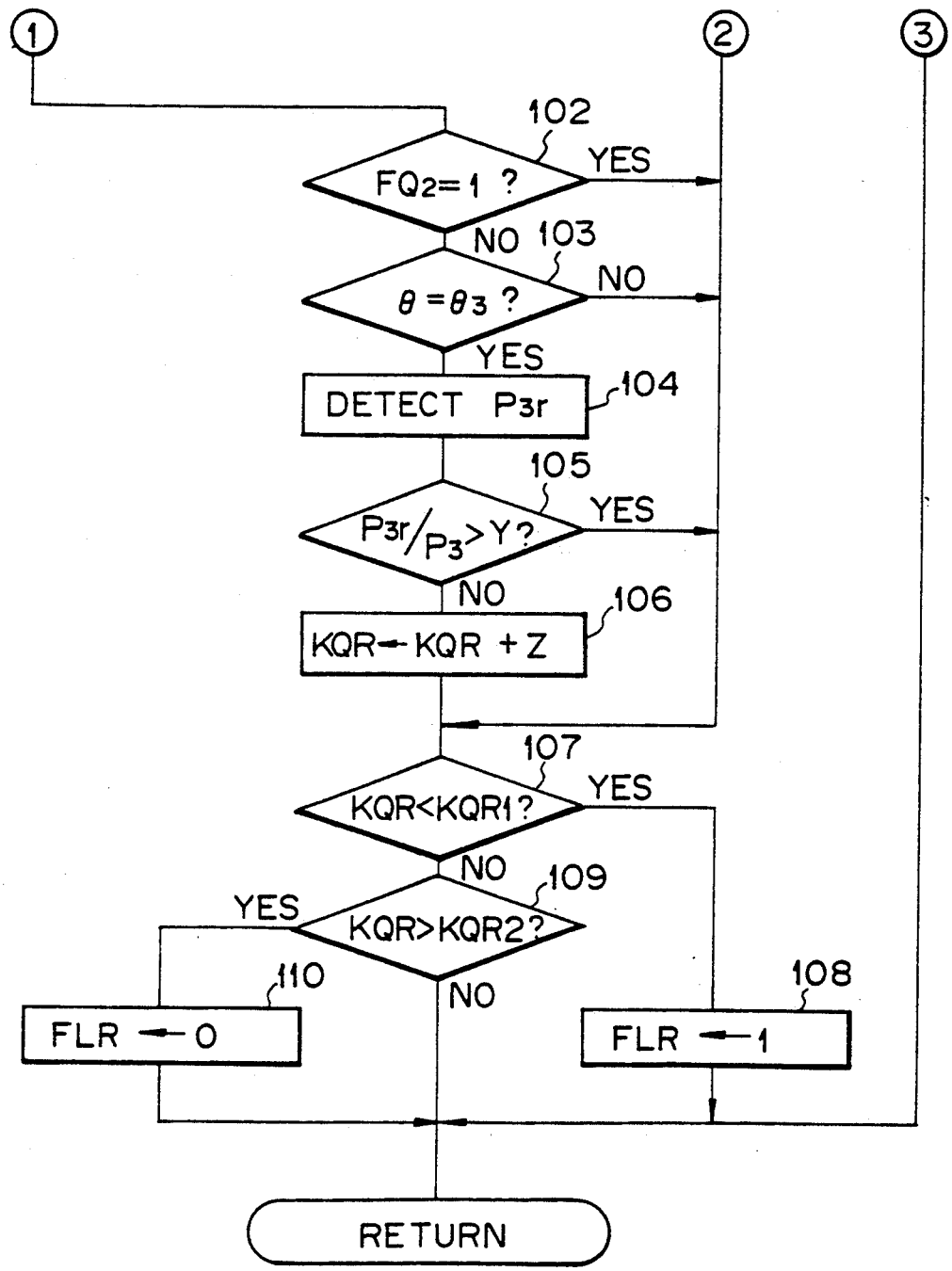

FIG. 11A and FIG. 11B show the routine for calculating the correction value KQR. This routine is executed by interruption every predetermined crank angle.

Figure 12:
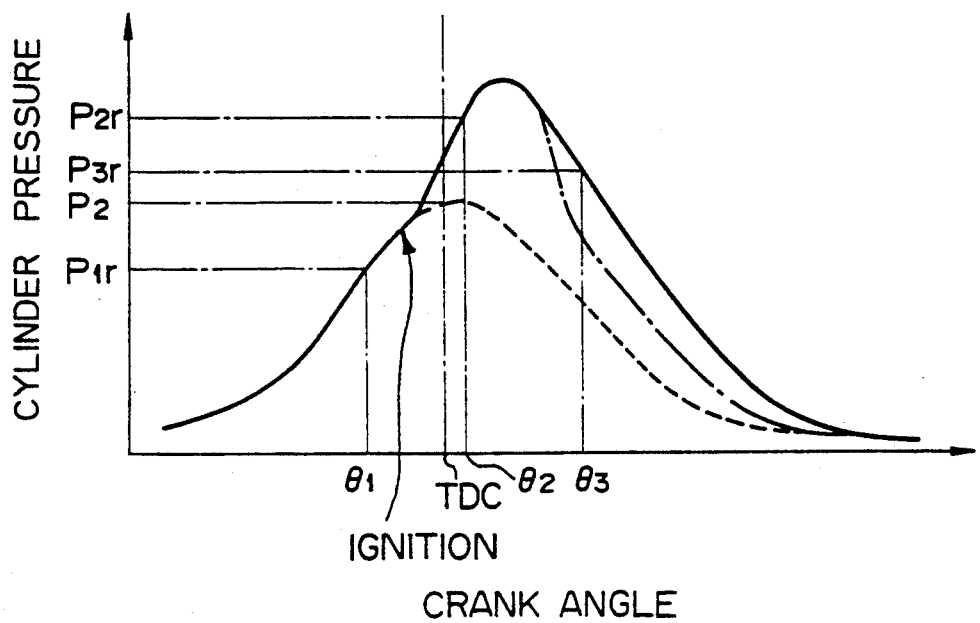
FIG. 12 is a graph of the relationship between the crank angle and the pressure in the cylinders.

Referring to FIG. 11A and FIG. 11B, first, at step 90, it is determined if the crank angle 8 is the predetermined crank angle $\theta_1$ (see FIG. 12).

FIG. 12 shows the relationship between the crank angle and the cylinder pressure. Referring to FIG. 12, the solid line shows the actual cylinder pressure when excellent combustion is achieved, the broken line shows the cylinder pressure when combustion is not performed, and the dot-chain line shows the cylinder pressure at the time of poor flame propagation.

$\theta_1$ is a predetermined crank angle in the compression stroke just before ignition. The actual cylinder pressure detected at $\theta_1$ is made $P_{1r}$. $\theta_2$ is a predetermined crank angle near the crank angle where the cylinder pressure at combustion is the greatest right after the TDC. The cylinder pressure at $\theta_2$ when combustion is not performed is made $P_2$ and the cylinder pressure detected at $\theta_2$ is made $P_{2r}$. $\theta_3$ is a predetermined crank angle in the combustion stroke in the latter period of combustion. The actual cylinder pressure detected at $\theta_3$ is made $P_{3r}$.

Referring again to FIG. 11A and FIG. 11B, if the decision at step 90 is negative, the routine proceeds to step 94, where it is determined if the crank angle $\theta$ is $\theta_2$. If the decision is negative, the routine proceeds to step 102, where it is determined if the misfiring flag $FQ_2$ is set, that is, if early misfiring has occurred. If the decision is negative, the routine proceeds to step 103, where it is determined if the crank angle $\theta$ is $\theta_3$. If the decision is negative, the routine proceeds to step 107, where it is determined if the correction value KQR is smaller than a predetermined lower limit value KQR1.

When the correction value KQR is smaller, the division rate QR becomes smaller (see step 73 in FIG. 8). If the division rate QR is small, the ratio of the amount of fuel injection in the compression stroke becomes larger, so the air-fuel mixture near the spark plug at the time of ignition becomes richer. Therefore, in the case where the correction value KQR is small, such as when KQR<KQR1, it is determined that the air-fuel mixture near the spark plug at the time of ignition is rich and at step 108, the rich flag FLR is set to 1.

On the other hand, when KQR≧KQR1, the routine proceeds to step 109, where it is determined if the correction value KQR is larger than the predetermined upper limit KQR2. Here, KQR2>KQR1. When the correction value KQR is larger, the division rate QR also becomes larger (see step 73 in FIG. 8). If the division rate QR is large, the ratio of the amount of fuel injection at the compression stroke becomes smaller, so the air-fuel mixture near the spark plug at the time of ignition becomes lean. Therefore, in the case where the correction value KQR is large such as when KQR>KQR2, it is determined that the air-fuel mixture near the spark plug at the time of ignition is lean and at step 110 the rich flag FLR is reset to 0.

On the other hand, when KQR≦KQR2, the rich flag FLR is not changed.

Figure 13:
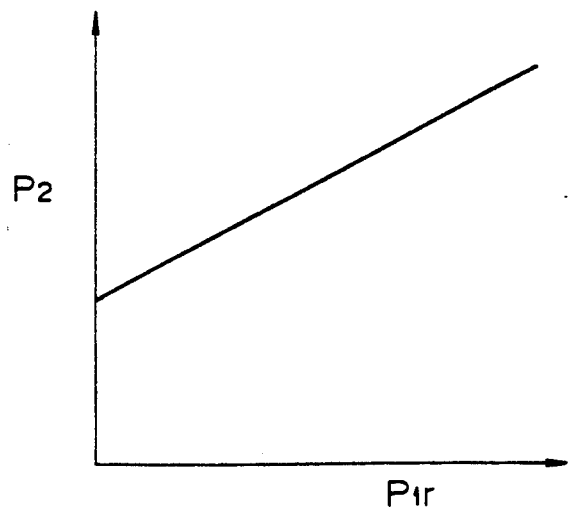
FIG. 13 is a graph of the relationship between $P_{1r}$ and $P_2$.

In the next and subsequent processing cycles, when it is determined at step 90 that $\theta = \theta_1$, the routine proceeds to step 91, where the actual cylinder pressure $P_{1r}$ at the crank angle $\theta_1$ is detected. At step 92, $P_2$ is found from the map (see FIG. 13) based on $P_{1r}$. $P_2$ is increased linearly in accordance with the increase of $P_{1r}$. At step 93, $P_3$ is found from the map (see FIG. 14) based on $P_{1r}$ and the amount of fuel injection Q. $P_3$ is the reference cylinder pressure for determining if the cylinder pressure $P_{3r}$ detected at the crank angle $\theta_3$ is the cylinder pressure when excellent combustion is achieved. After the above processing, the routine is ended.

In the next and subsequent processing cycles, when it is determined at step 94 that $\theta = \theta_2$, the routine proceeds to step 95, where the actual cylinder pressure $P_{2r}$ at the crank angle $\theta_2$ is detected. At step 96, it is determined if $P_{2r}/P_2$ is larger than a judgement value W. When the fuel is excellently ignited and no early misfiring occurs, $P_{2r}$ becomes sufficiently larger than $P_2$, so $P_{2r}/P_2 > W$ and the routine proceeds to step 97, where the misfiring flag $FQ_2$ is reset.

On the other hand, when early misfiring occurs, it is judged that $P_{2r}/P_2 \leq W$ and the routine proceeds to step 98. At step 98, it is determined if the rich flag FLR is set to 1. This rich flag FLR is a measure for determining if the air-fuel mixture near the spark plugs at the time of ignition is rich or not. When the rich flag FLR is set to 1, it is judged that the mixture is rich.

When the decision at step 98 is affirmative, that is, it is determined that rich misfiring has occurred due to the air-fuel mixture near the spark plugs at the time of ignition being rich, the routine proceeds to step 99, where the correction coefficient KQR is increased by X. By this, the division rate QR is increased (see step 73 in FIG. 8) and therefore the ratio of the fuel injection in the compression stroke is reduced and the air-fuel mixture near the spark plugs at the time of ignition can be made leaner. As a result, rich misfirings can be prevented and excellent combustion can be obtained.

On the other hand, when the decision at step 98 is negative, that is, when it is determined that lean misfiring has occurred due to the air-fuel mixture near the spark plugs at the time of ignition being lean, the routine proceeds to step 100, where the correction coefficient KQR is reduced by X. By this, the division rate QR is reduced and therefore the ratio of the amount of fuel injection in the compression stroke is increased and the air-fuel mixture near the spark plugs at the time of ignition can be made richer. As a result, lean misfirings can be prevented and excellent combustion can be obtained.

At step 101, the misfiring flag $FQ_2$ is set to 1. After this, the routine proceeds to step 107, where the FLR is controlled and then the main routine is ended.

In the next and subsequent processing cycles, the routine proceeds to step 102, where is $FQ_2$ is set to 1, that is, if it is determined that early misfirings occur, step 103 to step 106 are skipped. That is, step 103 to step 106 are executed only when no early misfirings occur.

If the decision at step 102 is negative, the routine proceeds to step 103, where it is determined if the crank angle $\theta$ is $\theta_3$. When $\theta$ becomes $\theta_3$, the routine proceeds to step 104, where the actual cylinder pressure $P_{3r}$ (see FIG. 12) at the crank angle $\theta_3$ is detected. At step 105, it is determined if $P_{3r}/P_3$ is larger than the judgement value Y. When combustion is excellent and poor flame propagation does not occur, $P_{3r}$ becomes sufficiently large with respect to $P_3$, so $P_{3r}/P_3 > Y$ and step 106 is skipped.

On the other hand, when poor flame propagation occurs and excellent combustion is not achieved, it is determined that $P_{3r}/P_3 \leq Y$ and the routine proceeds to step 106, where the correction value KQR is increased by Z. That is, poor flame propagation occurs due to the air-fuel premixture being lean, so by increasing the correction value KQR, the division rate QR is increased and the ratio of the amount of fuel injection in the intake stroke is increased. As a result, the air-fuel premixture can be made leaner and excellent combustion can be obtained.

As explained above, according to the present embodiment, the cylinder pressure is detected, the state of combustion is evaluated based on the cylinder pressure, and the ratio of the amount of fuel injection in the intake stroke and the amount of fuel injection in the compression stroke is changed based on the evaluation, so it is possible to obtain excellent combustion.

Note that while this embodiment showed the use of a single fuel injector to perform the fuel injection in the intake stroke and the fuel injection in the compression stroke, it is possible to add port fuel injectors at the intake ports of the cylinders and use these port fuel injectors to perform the injection at the intake stroke.

Although the present invention has been described with reference to specific embodiments chosen for purposes of illustration, it should be apparent that numerous modifications can be made thereto without departing from the basic concept and scope of the invention.

I claim:

1. A control device for an internal combustion engine having a cylinder and a spark plug, said control device comprising:

a fuel feeding means for feeding an amount of fuel into the cylinder, the fuel feeding means feeding a part of the amount of fuel into the cylinder during an intake stroke to form an air-fuel premixture, and feeding the remaining part of said amount of fuel into the cylinder during a compression stroke to form an air-fuel mixture around the spark plug for ignition;

a pressure detecting means for detecting a pressure in the cylinder;

a combustion state determining means for determining a combustion state in the cylinder on the basis of the pressure detected by the pressure detecting means; and a fuel feeding control means for controlling a ratio of the part of the amount of fuel to be fed into the cylinder during the intake stroke to the amount of fuel to be fed into the cylinder on the basis of the combustion state determined by the combustion state determining means so that a good state of combustion is obtained.

2. A control device as set forth in claim 1, wherein said fuel feeding control means changes said ratio by a correction value.

3. A control device as set forth in claim 2, wherein said fuel feeding control means changes said ratio by adding said correction value.

4. A control device as set forth in claim 3, wherein said correction value is not changed when said combustion state determining means determines that misfiring does not occur and is changed when said combustion state determining means determines that misfiring occurs.

5. A control device as set forth in claim 4, wherein when said combustion state determining means determines that misfiring occurs, said correction value is increased when an air-fuel mixture around the spark plug at the time of ignition is rich and is decreased when the air-fuel mixture around the spark plug at the time of ignition is lean.

6. A control device as set forth in claim 5, wherein it is determined that the air-fuel mixture around the spark plug at the time of ignition is rich when said correction value is smaller than a predetermined first value and it is determined that the air-fuel mixture around the spark plug at the time of ignition is lean when said correction value is larger than a predetermined second value which is larger than said predetermined first value.

7. A control device as set forth in claim 4, wherein said combustion state determining means determines that misfiring occurs when a pressure detected at a predetermined crank angle by said pressure detecting means is lower than a predetermined pressure.

8. A control device as set forth in claim 7, wherein said predetermined crank angle is near a top dead center in a compression stroke.

9. A control device as set forth in claim 7, wherein said combustion state determining means determines that misfiring occurs when a ratio of said pressure detected at said predetermined crank angle to a compression pressure in the cylinder at said predetermined crank angle when combustion is not carried out is smaller than a predetermined value.

10. A control device as set forth in claim 9, wherein said compression pressure is calculated from a pressure detected at a crank angle before ignition in the compression stroke by said pressure detecting means.

11. A control device as set forth in claim 3, wherein said correction value is increased when said combustion state determining means determines that the flame propagation is poor.

12. A control device as set forth in claim 11, wherein said combustion state determining means determines that the flame propagation is poor when a pressure detected at a predetermined crank angle by said pressure detecting means is lower than a predetermined pressure.

13. A control device as set forth in claim 12, wherein said predetermined crank angle is in a latter half of a combustion stroke.

14. A control device as set forth in claim 12, wherein said combustion state determining means determines that the flame propagation is poor when a ratio of said pressure detected at said predetermined crank angle to a combustion pressure in the cylinder at said predetermined crank angle when the flame propagation is good is smaller than a predetermined value.

15. A control device as set forth in claim 14, wherein said combustion pressure is calculated from a pressure detected at a crank angle before ignition in the compression stroke by said pressure detecting means and said amount of fuel to be injected.

16. A control device as set forth in claim 1, further including a plurality of cylinders, wherein said fuel feeding means includes a corresponding plurality of fuel injectors, each fuel injector being associated with a respective cylinder, and wherein each fuel injector injects said part of said amount of fuel to be fed into its respective cylinder during the intake stroke and injects the remaining part of said amount of fuel to be fed into the respective cylinder during the compression stroke.

17. A control device as set forth in claim 1, wherein said fuel feeding means includes a first fuel injector arranged in the cylinder and a second fuel injector which injects fuel into an intake port of the cylinder, and wherein the second fuel injector injects the part of the amount of fuel to be fed into the cylinder during the intake stroke, and the first fuel injector injects the remaining part of the amount of fuel to be fed into the cylinder during the compression stroke.

* * * * *